US011084046B2

(12) United States Patent
Anderson et al.

(10) Patent No.: US 11,084,046 B2
(45) Date of Patent: Aug. 10, 2021

(54) AEROSOL CONCENTRATING APPARATUS FOR USE WITH AEROSOL AGING DRUM

(71) Applicant: The Government of the United States, as Represented by the Secretary of the Army, Ft. Detrick, MD (US)

(72) Inventors: Jaime B. Anderson, Hagerstown, MD (US); Mark M. Bailey, Alexandria, VA (US); Larry E. Bowen, Williamsport, MD (US); Brett R. Haupt, Thurmont, MD (US)

(73) Assignee: The Government of the United States, as Represented by the Secretary of the Army, Ft. Detrick, MD (US)

( * ) Notice: Subject to any disclaimer, the term of this patent is extended or adjusted under 35 U.S.C. 154(b) by 771 days.

(21) Appl. No.: 15/723,448

(22) Filed: Oct. 3, 2017

(65) Prior Publication Data

US 2018/0093281 A1    Apr. 5, 2018

Related U.S. Application Data

(60) Provisional application No. 62/403,524, filed on Oct. 3, 2016, provisional application No. 62/428,883, filed on Dec. 1, 2016.

(51) Int. Cl.
*B04B 5/08* (2006.01)
*B01D 45/14* (2006.01)
*B04B 11/02* (2006.01)

(52) U.S. Cl.
CPC ............... *B04B 5/08* (2013.01); *B01D 45/14* (2013.01); *B04B 11/02* (2013.01)

(58) Field of Classification Search
CPC ............ B01D 45/14; B04B 5/08; B04B 11/02
(Continued)

(56) References Cited

U.S. PATENT DOCUMENTS 3,998,610 A * 12/1976 Leith ...................... B01D 59/20
                                                            95/35
4,348,985 A    9/1982 Leong
(Continued)

FOREIGN PATENT DOCUMENTS

CN         104305997 A      1/2015
DE       40 09 067 A1      12/1991
(Continued)

OTHER PUBLICATIONS

Broughton et al., "Effect of Electronic Compensation of Plethysmographic Airway Resistance Measurements," Pediatric Pulmonology, Vo. 42, Jul. 20, 2007, pp. 764-772.
(Continued)

*Primary Examiner* — Walter D. Griffin
*Assistant Examiner* — Shuyi S. Liu
(74) *Attorney, Agent, or Firm* — Leigh Callander

(57) ABSTRACT

An embodiment of the invention provides an aerosol concentrating apparatus for use with an aerosol aging drum, where the aerosol concentrating apparatus includes an outer housing, an aerosol inlet tube connected to the outer housing, and an extraction tube connected to the outer housing. An axle connected to the outer housing is axially centered within the outer housing, where the axle is formed from porous material. An inner housing is connected to the axle, such that the axle is axially centered within the inner housing, and such that the inner housing is adapted to spin about the axle within the outer housing to separate aerosol particles by size. Aerosol particles below a first threshold size are forced out of the aerosol concentrating apparatus through the axle; and, aerosol particles between the first threshold size and a second threshold size are suspended within the inner housing.

20 Claims, 18 Drawing Sheets

(58) Field of Classification Search
USPC .......................................................... 494/44
See application file for complete search history.

(56) References Cited

U.S. PATENT DOCUMENTS

| | | | |
|---|---|---|---|
| 4,402,315 A | 9/1983 | Tsuda et al. | |
| 4,520,808 A | 6/1985 | LaBauve | |
| 4,710,887 A | 12/1987 | Ho | |
| 4,721,060 A | 1/1988 | Cannon et al. | |
| 4,781,146 A | 11/1988 | Spengler | |
| 4,860,741 A | 8/1989 | Bernstein et al. | |
| 5,025,619 A | 6/1991 | Cannon | |
| 5,109,797 A | 5/1992 | Briant et al. | |
| 5,124,029 A | 6/1992 | Fjaellstroem et al. | |
| 5,156,776 A | 10/1992 | Loedding et al. | |
| 5,297,502 A | 3/1994 | Jaeger | |
| 5,320,108 A | 6/1994 | Cloutier | |
| 5,379,777 A | 1/1995 | Lomask | |
| 5,480,524 A * | 1/1996 | Oeste | B01D 53/8662 204/158.2 |
| 5,487,378 A | 1/1996 | Robertson et al. | |
| 5,887,586 A | 3/1999 | Dahlback et al. | |
| 5,896,829 A | 4/1999 | Rothenberg et al. | |
| 6,016,803 A | 1/2000 | Volberg et al. | |
| 6,131,571 A | 10/2000 | Lampotang et al. | |
| 6,224,560 B1 | 5/2001 | Gazula et al. | |
| 6,725,859 B1 | 4/2004 | Rothenberg et al. | |
| 6,904,912 B2 | 6/2005 | Roy et al. | |
| 7,377,276 B2 | 5/2008 | Roy et al. | |
| 7,527,021 B2 | 5/2009 | Mead et al. | |
| 3,221,329 A1 | 7/2012 | Hartings et al. | |
| 8,966,958 B2 * | 3/2015 | Olfert | G01N 15/0255 73/28.04 |
| 8,985,100 B2 | 3/2015 | Minocchieri et al. | |
| 9,180,263 B2 | 11/2015 | Gumaste et al. | |
| 2004/0216737 A1 | 11/2004 | Anderson et al. | |
| 2009/0013997 A1 | 1/2009 | Barnewall et al. | |
| 2011/0206573 A1 * | 8/2011 | Ackley | B01D 53/0431 422/218 |
| 2014/0020687 A1 | 1/2014 | Cullen et al. | |
| 2015/0246364 A1 * | 9/2015 | Ji | B01D 21/34 494/37 |
| 2020/0022795 A1 | 1/2020 | Haupt et al. | |
| 2020/0023152 A1 | 1/2020 | Bowen | |

FOREIGN PATENT DOCUMENTS

| | | |
|---|---|---|
| JP | 2-177955 A | 7/1990 |
| WO | 96/00046 A1 | 1/1996 |
| WO | 96/13294 A1 | 5/1996 |
| WO | 02/060336 A1 | 8/2002 |
| WO | 03/101339 A1 | 12/2003 |
| WO | 2004/071330 A2 | 8/2004 |

OTHER PUBLICATIONS

Decker et al., abstract for "A Method for Measuring Respiratory Volume Parameters of Large Animals During Exposure to Aerosols," American Industrial Hygiene Association Journal, vol. 40, No. 7, 1979, printed from www.tandfonline.com/doi/abs/10.1080/15298667991430000 on Nov. 30, 2015.
Hartings et al., "The Automated Bioaersol Exposure System: Preclinical Platform Development and a Respiratory Dosimetry Application With Nonhuman Primates," Journal of Pharmacological and Toxicological Methods, vol. 49, 2004, pp. 39-55.
Espacenet, English Abstract of CN104305997.
Espacenet, English Abstract of DE4009067.
Espacenet, English Abstract of JP02177955.

* cited by examiner

Aerosol Centrifuge Design

$F_O = F_L + F_H$ $F_L$ = Flow of lights (particles → O)

$F_H$ = Flow of heavies (particles → $C_O$)

Residual time: $\tau = \dfrac{V}{F_O} = \dfrac{\pi R^2 h}{F_O}$

— FIG. 1B

Terminal Velocity:

$V_t = \dfrac{mrw^2}{6\pi\mu r_0}$ r = radial position of particle
$r_0$ = radius of particle (m)
m = mass of particle (kg)
$\mu$ = Fluid viscocity (Pa-s)
w = Rotational speed (s-1)

— FIG. 1C

Position Function:

$V_T(t) = \dfrac{dr}{d\tau} = \dfrac{mw^2 r}{6\pi\mu r_0}$ $\displaystyle\int \dfrac{dr}{r} = \int \dfrac{mw^2 r}{6\pi\mu r_0} d\tau$ $\ln(r) = \dfrac{mw^2}{6\pi\mu r_0} \cdot \tau + C$ $r = \exp\left[\dfrac{mw^2}{6\pi\mu r_0} \cdot \tau\right] \cdot C$ $R_i = \exp\left[\dfrac{mw^2}{6\pi\mu r_0} \cdot 0\right] \cdot C$ $C = R$

— FIG. 1D initial condition: $r(0) = R_i$ $r(t) = R_i \cdot \exp\left[\dfrac{mw^2}{6\pi\mu r_0} \cdot \tau\right]$

— FIG. 1E

Separation Condition:
Find w such that $(\bar{r}) = R$ $$\ln(r) = \ln(R_i) + \frac{mw^2 \cdot \tau}{6\pi\mu r_0}$$

$$\ln(R) = \ln(R_i) + \frac{mw^2 \cdot \tau}{6\pi\mu r_0}$$

$$\ln(R) - \ln(R_i) = \frac{mw^2 \tau}{6\pi\mu r_0}$$

$$\ln\left(\frac{R}{R_i}\right) = \frac{mw^2 \cdot \tau}{6\pi\mu r_0}$$

$$w^2 = \frac{6\pi\mu r_0 \ln\left(\frac{R}{R_i}\right)}{\mu\tau}$$

Substitute $\tau = \frac{\pi R^2 h}{F_O}$      $m = P_{particle} \cdot V_{particle}$
$= P_{particle} \cdot \frac{4}{3}\pi r_0^3$ $$w = \frac{3}{r_0 R}\left[\frac{F_O \mu \ln\left(\frac{R}{R_i}\right)}{2\pi P_p h}\right]^{1/2}$$

$$w = \frac{3}{wr_0}\left[\frac{F_O \mu \ln\left(\frac{R}{R_i}\right)}{2\pi P_p h}\right]^{1/2}$$

let $R_i = 0.5 \cdot R$ $$\therefore R = \frac{3}{wr_0}\left[\frac{F_O \mu \ln(2)}{2\pi P_p h}\right]^{1/2}$$

FIG. 2

```
┌─────────────────────────────────────────────────┐
│ Insert aerosol particles into an outer housing  │──── 810
│ of an aerosol concentrating apparatus through   │
│ an aerosol inlet tube                           │
└─────────────────────────────────────────────────┘
                         │
                         ▼
┌─────────────────────────────────────────────────┐
│ Rotate an inner housing inside of the outer     │──── 820
│ housing to separate the aerosol particles by size│
└─────────────────────────────────────────────────┘
                         │
                         ▼
┌─────────────────────────────────────────────────┐
│ Extract aerosol particles below a first         │──── 830
│ threshold size through a porous central axle    │
└─────────────────────────────────────────────────┘
                         │
                         ▼
┌─────────────────────────────────────────────────┐
│ Force aerosol particles above a second threshold│──── 840
│ size to an inner wall of the inner housing      │
│ and/or through an aerosol extraction tube       │
└─────────────────────────────────────────────────┘
                         │
                         ▼
┌─────────────────────────────────────────────────┐
│ Suspend aerosol particles between the first     │──── 850
│ threshold size and the second threshold size    │
│ within the inner housing                        │
└─────────────────────────────────────────────────┘
```

FIG. 8

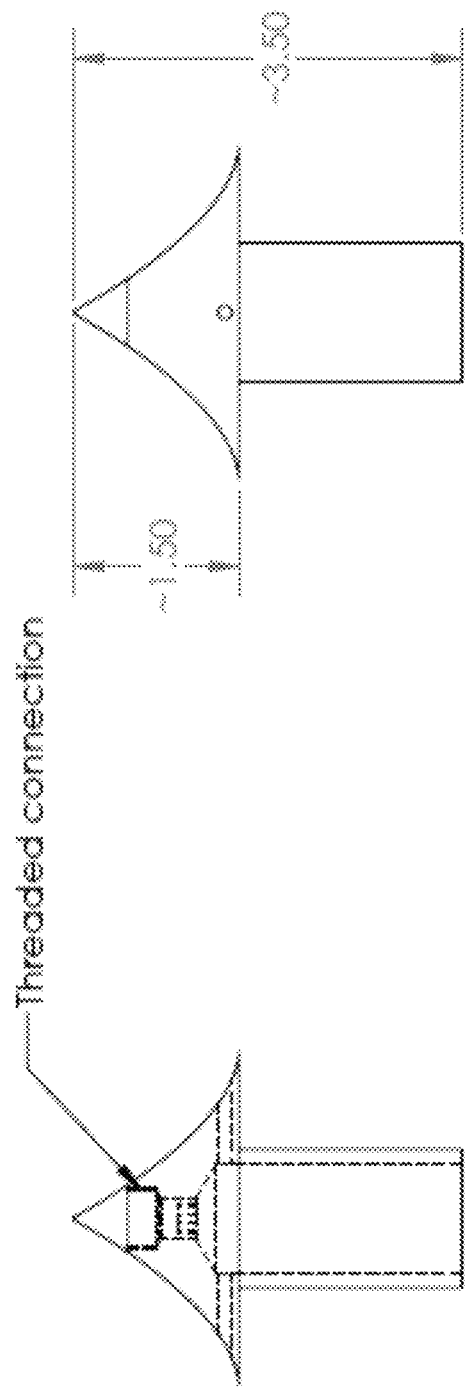

1310 — Inject aerosol particles into an inlet port of a rotating drum

1320 — Expel air from the rotating drum via a nozzle to concentrate the aerosol particles within the rotating drum 1330 — Close the inlet port and the nozzle when the desired aerosol concentration is reached 1340 — Expose the aerosol particles to one or more environmental conditions 1350 — Evacuate the aerosol particles directly from the rotating drum into an exposure chamber and/or a testing apparatus after an aging period

AEROSOL CONCENTRATING APPARATUS FOR USE WITH AEROSOL AGING DRUM

This application claims benefit of U.S. Patent Application Ser. No. 62/403,524 filed on Oct. 3, 2016 and U.S. Patent Application Ser. No. 62/428,883 filed on Dec. 1, 2016, the entireties of which are incorporated by reference.

I. FIELD OF INVENTION

The present invention relates to systems, methods, and computer program products for an aerosol concentrating apparatus for use with aerosol aging drum, in particular for simulating operational conditions.

II. SUMMARY OF THE INVENTION

An embodiment of the invention provides an aerosol concentrating apparatus for use with an aerosol aging drum, where the aerosol concentrating apparatus includes an outer housing, an aerosol inlet tube connected to the outer housing, and an extraction tube connected to the outer housing. An axle connected to the outer housing is axially centered within the outer housing, where the axle is formed from porous material. An inner housing is connected to the axle, such that the axle is axially centered within the inner housing, and such that the inner housing is adapted to spin about the axle within the outer housing to separate aerosol particles by size. Aerosol particles below a first threshold size are forced out of the aerosol concentrating apparatus through the axle; and, aerosol particles between the first threshold size and a second threshold size are suspended within the inner housing.

Another embodiment provides a method of concentrating aerosol with an aerosol concentrating apparatus for use with an aerosol aging drum. Aerosol particles are released into an outer housing of the aerosol concentrating apparatus through an aerosol inlet tube connected to the outer housing. An inner housing inside of the outer housing rotates to separate the aerosol particles by size, such that the inner housing rotates around a porous central axle inside of the outer housing. Aerosol particles below a first threshold size are extracted through the porous central axle. Aerosol particles between the first threshold size and a second threshold size are suspended within the inner housing.

Yet another embodiment of the invention provides a method for aerosol aging and concentrating for simulating operational conditions where aerosol particles are injected into an inlet port of a rotating drum. Air from the rotating drum is expelled via a nozzle to concentrate the aerosol particles within the drum; and, the inlet port and the nozzle are closed when a desired aerosol concentration is reached. The aerosol particles are exposed to at least one environmental condition; and, the aerosol particles are evacuated from the rotating drum after an aging period. The aerosol particles can be evacuated directly from the rotating drum into an exposure chamber and/or a testing apparatus.

In still yet another embodiment, a system for aerosol aging and concentrating for simulating operational conditions includes a rotatable drum and an inlet port connected to the rotatable drum that receives aerosol particles. A nozzle connected to the rotatable drum expels air from the rotatable drum to concentrate the aerosol particles within the rotatable drum. An exposure device exposes the aerosol particles to one or more environmental conditions. An outlet port connected to the rotatable drum evacuates the aerosol particles directly from the rotatable drum into an exposure chamber and/or a testing apparatus.

III. BRIEF DESCRIPTION OF THE SEVERAL VIEWS OF THE DRAWINGS

The present invention is described with reference to the accompanying drawings. In the drawings, like reference numbers indicate identical or functionally similar elements.

FIGS. 1A-2 illustrate the underlying mathematical steps used in an aerosol centrifuge design according to an embodiment of the invention.

FIG. 8 is a flow diagram illustrating a method for using an aerosol concentrating apparatus according to an embodiment of the invention.

FIG. 16 illustrates the geometry of the rotating drum aerosol concentrator according to an embodiment of the invention.

FIG. 17 illustrates the geometry of the rotating drum aerosol concentrator according to an embodiment of the invention.

FIG. 21 is a flow diagram illustrating a method of aerosol aging and concentrating for simulating operational conditions according to an embodiment of the invention.

IV. DETAILED DESCRIPTION

Non-limiting embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system and method for an aerosol centrifuge for use upstream with an aerosol aging drum apparatus. The system is suitable for continuously concentrating large quantities of aerosol in conjunction with the aerosol aging drum.

The system can facilitate experiments that examine the effects of aging and environment on the viability of chemical or biological aerosols by simulating operational environments relevant to military and aid operations. The system can be a modular component of an integrated modular bioaerosol respiratory exposure system (IMBRE) and can be controlled by the IMBRE software. The system can facilitate the exposure of animal experimental models to biological and chemical agents for pathogenesis and/or toxicity studies, and for therapeutic, vaccine, and/or prophylactic development against operationally relevant agents.

The system can include a low density fluid centrifuge for use with the aerosol aging drum to continuously concentrate aerosol prior to loading into the drum. In at least one embodiment, the system is used to develop animal models for biothreat agents and for in vivo studies to develop medical countermeasures against biothreat agents of military importance. The system can also be used to concentrate inhalation medical countermeasures.

Figure 1F:
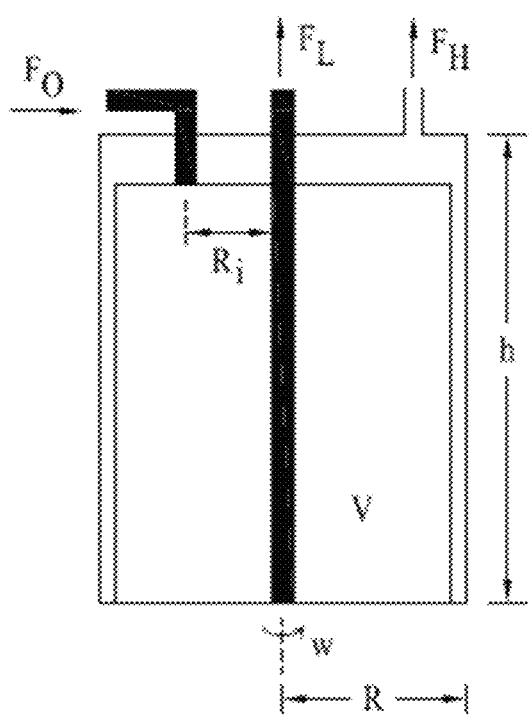
FIG. 1F illustrates how some of the variables related to the system.

FIGS. 1A-2 illustrate the mathematical steps used as part of designing an aerosol centrifuge according to an embodiment of the invention, where the size of the aerosol centrifuge is optimized to drive particles to the outer radius (R) of the centrifuge. This is a concentration mechanism, and the concentrated particles are drawn out at radius R. FIGS. 1D and 1E illustrate a position function derived from the terminal radial velocity of the particles derived from FIGS. 1A-1C. FIG. 1F illustrates an aerosol apparatus having a vertical orientation and annotated with some of the variables used in FIGS. 1A-1F. FIG. 2 shows the rotational speed (w) required for the residence time of the particles in the centrifuge to be long enough for the particles to make it to R, and then solves for R.

Figure 3:
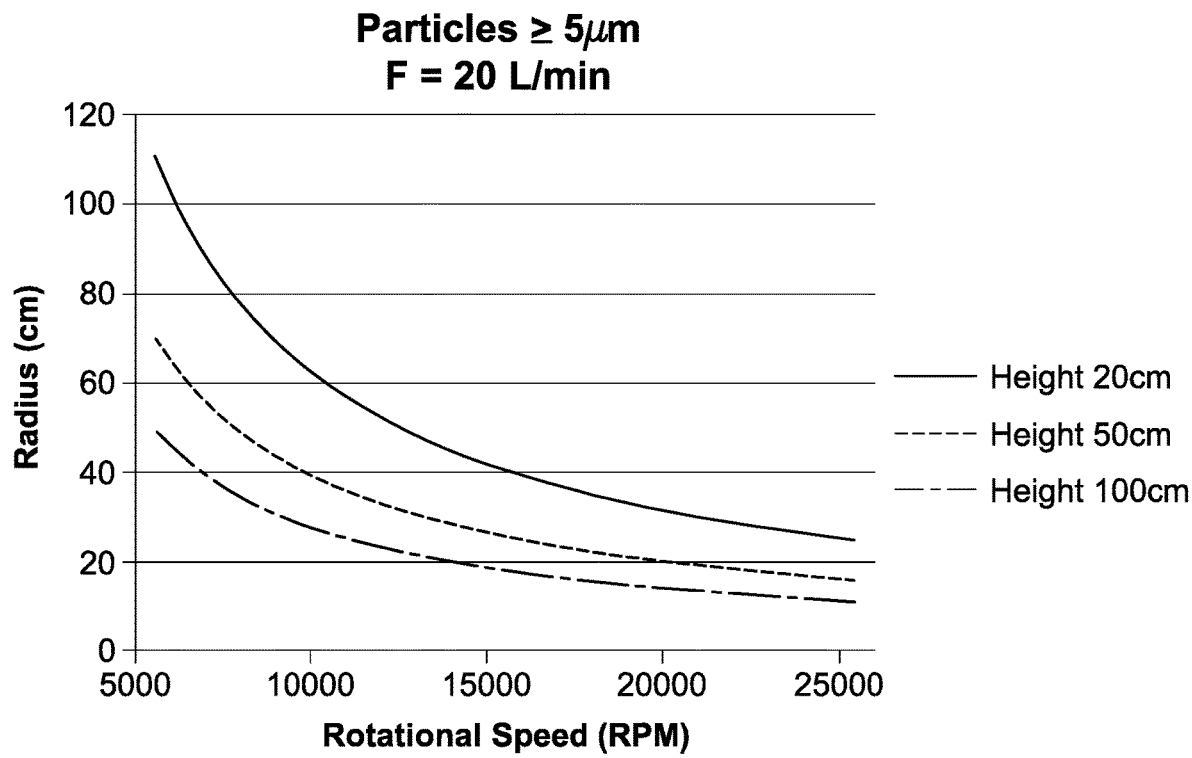
FIG. 3 is a graph illustrating radius of an aerosol aging drum versus rotational speed according to an embodiment of the invention.
Figure 4:
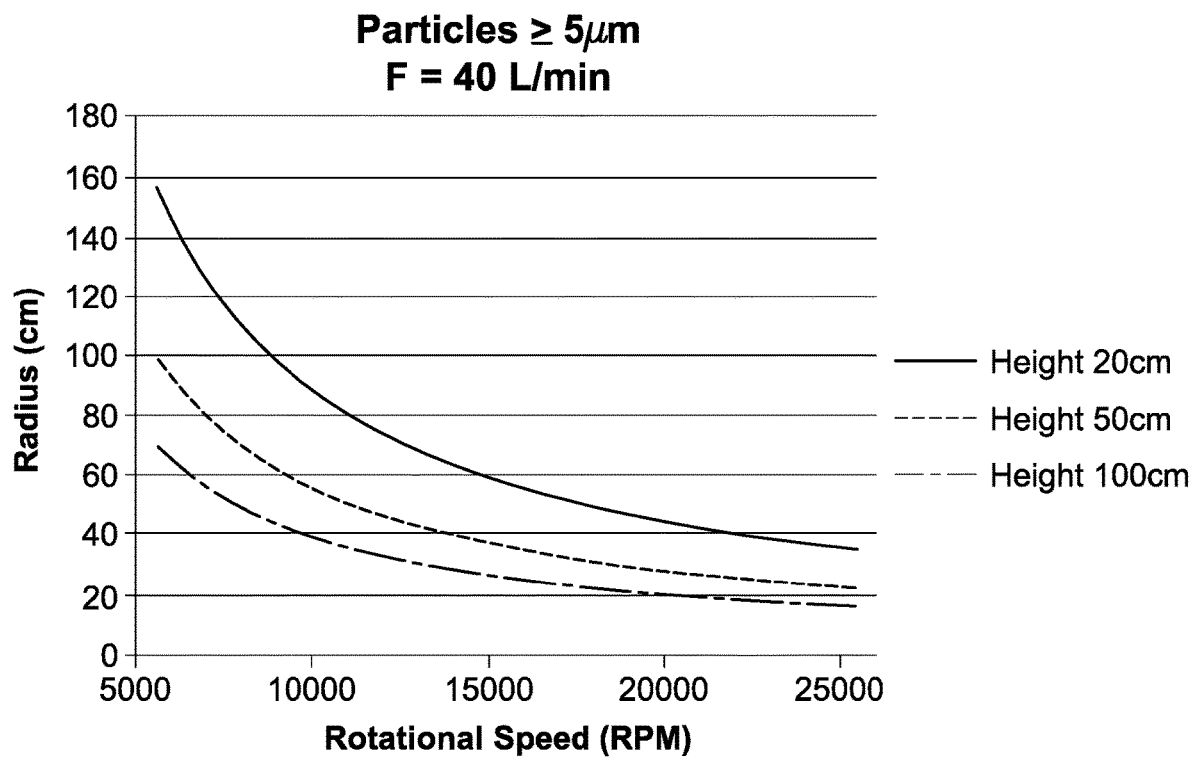
FIG. 4 is a graph illustrating radius of an aerosol aging drum versus rotational speed according to an embodiment of the invention.

FIGS. 3 and 4 show the rotational speed (RPM) required for concentration at various flow rates from the equation for radius R derived in FIG. 2 (top and bottom graph) as a function of flow rate (F) (20 L/min and 40 L/min) and centrifuge height (Height), for particles greater than 5 microns in diameter.

Figure 5:
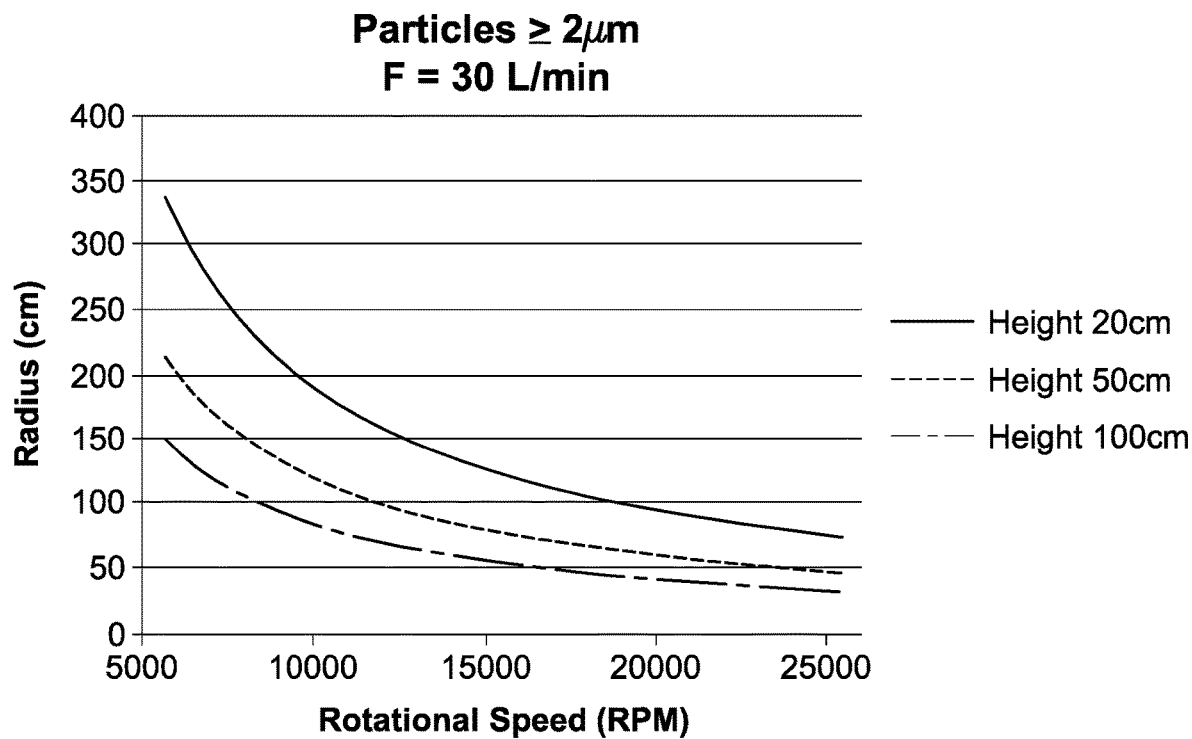
FIG. 5 is a graph illustrating radius of an aerosol aging drum versus rotational speed according to an embodiment of the invention.
Figure 6:
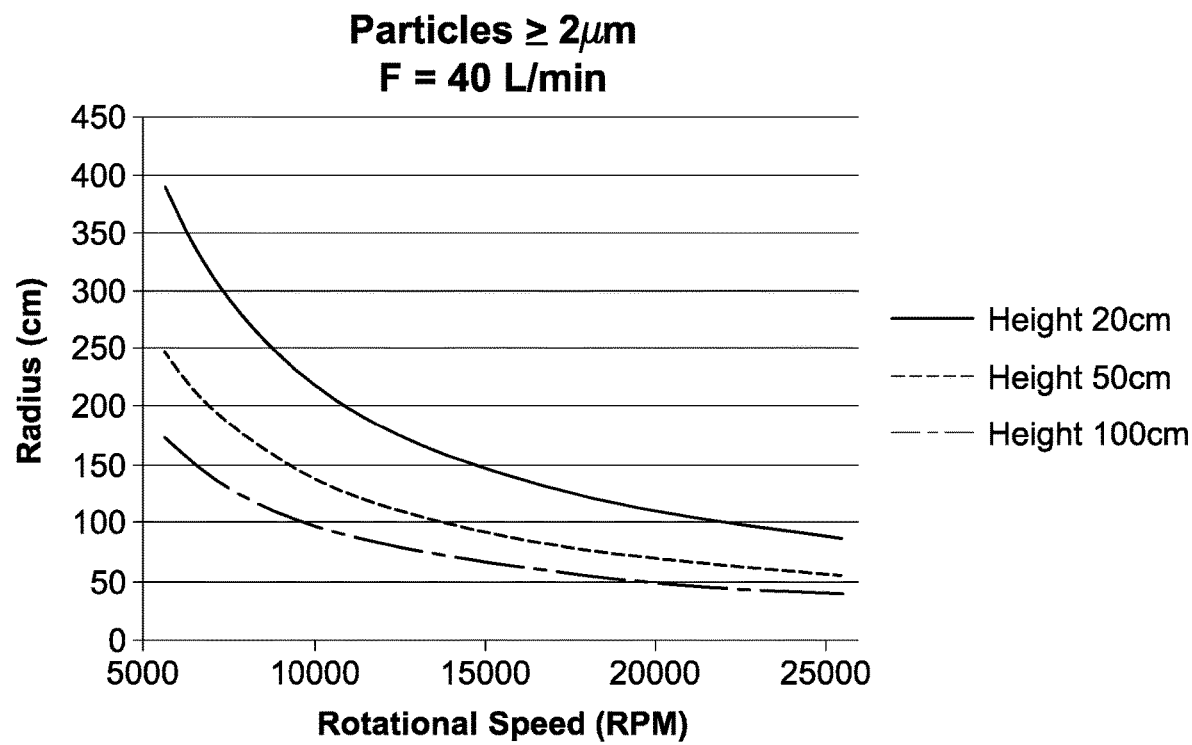
FIG. 6 is a graph illustrating radius of an aerosol aging drum versus rotational speed according to an embodiment of the invention.

FIGS. 5 and 6 show the rotational speed required for concentration at various flow rates from the equation for radius R derived in FIG. 2 (top and bottom graph) as a function of flow rate (F) (20 L/min and 40 L/min) and centrifuge height (Height), for particles greater than 2 microns in diameter. The top lines in each graph represent a height of 20 cm; the middle lines in each graph represent a height of 50 cm; and, the bottom lines in each graph represent a height of 100 cm.

Figure 7:
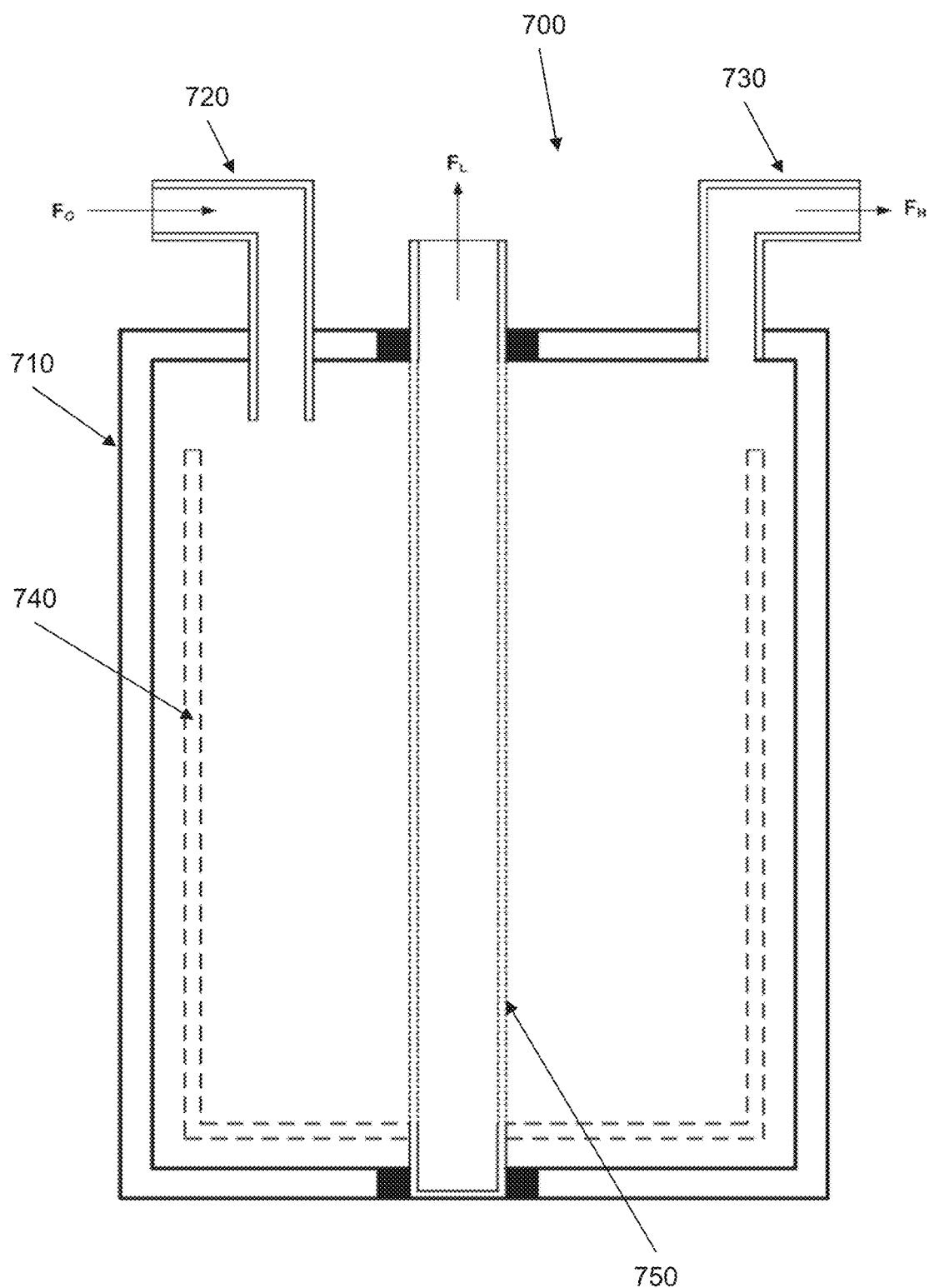
FIG. 7 illustrates an aerosol concentrating apparatus according to an embodiment of the invention.

FIG. 7 illustrates a cross-sectional view of an aerosol concentrating apparatus 700 for use with an aerosol aging drum according to an embodiment of the invention. The illustrated aerosol concentrating apparatus 700 includes a metallic outer housing 710, an aerosol inlet tube 720 connected to the outer housing 710, and an extraction tube 730 connected to the outer housing 710. The extraction tube 730 can be connected to the aerosol aging drum (not shown as being connected to apparatus 700). As used herein, the term "connected" includes operationally connected, in communication with, physically connected, engaged, coupled, contacts, linked, affixed, and attached.

The apparatus 700 can also include an inner housing 740 connected to an axle 750, where the axle 750 is connected to the outer housing 710 such that the axle 750 is axially centered within the outer housing 710. The axle 750 can be axially centered within the inner housing 740; and, the axle 750 can be formed from porous material to allow particles to enter the axle and leave the system. The axle 750 is illustrated in FIG. 7 as having porous material from the connection point with the inner housing 740 to the bearing near the exhaust outlet for the axle 750. The axle 750 can be connected to the distal end of the inner housing 740 and to the outer housing 710 using sealed bearings. The outer housing 710, the inner housing 740, and/or the axle 750 can be cylindrical shaped.

In at least one embodiment, the inner housing 740 is formed from wire mesh and is adapted to spin about the axle 750 within the outer housing 710 to separate aerosol particles by size. In other words, the inner housing 740 spins with the axle 750 at the same speed. More specifically, aerosol particles below a first threshold size can be forced out of the aerosol concentrating apparatus 700 through the axle 750; and, aerosol particles above a second threshold size can be forced against an inner wall of the outer housing 710. Aerosol particles between the first threshold size and a second threshold size can be forced through the inner housing 740 and collected. The inner housing 740 can be adapted to spin about the axis 750 at a rate up to three thousand rotations per minute.

In at least one embodiment, the wire mesh basket spins to create a spiral motion of the air and suspended aerosol because of their viscosity. Smaller, unwanted particles can be exhausted through the porous axle 750. Large, unwanted particles can be accelerated through the wire basket and deposited on the wall of the outer housing 710. Some larger particles can fall out of the spiraling air/aerosol complex to the bottom of the basket. Desirable particles can be accelerated through the wire basket and can be siphoned out of the device. The outer housing 710 can be stationary to provide protection from injury from the spinning components.

FIG. 8 is a flow diagram illustrating a method for using an aerosol concentrating apparatus for use with an aerosol aging drum (e.g., the aerosol concentrating apparatus 700) according to an embodiment of the invention. Aerosol particles can be inserted into an outer housing of the aerosol concentrating apparatus through an aerosol inlet tube 720 connected to the outer housing 710, 810.

In at least one embodiment, an inner housing 740 inside of the outer housing 710 is rotated to separate the aerosol particles by size, such that the inner housing 740 rotates around a porous central axle 750 inside of the outer housing 710, 820. The central axle 750 can also rotate at the same speed as the inner housing 740. The rotation of the inner housing 740 can be performed continuously or in an intermittent pulse mode. The rotation of the inner housing 740 can be performed at a rate of up to three thousand rotations per minute.

Aerosol particles below a first threshold size can be extracted through the porous central axle 750, 830. Aerosol particles above a second threshold size can be forced to an inner wall of the outer housing 710 and/or through an aerosol extraction tube 730 connected to the outer housing 710, 840. Aerosol particles between the first threshold size and the second threshold size can be suspended within the inner housing 740, 850. The suspended aerosol particles between the first threshold size and the second threshold size can be aged within the inner housing 740.

At least one embodiment of the invention includes a system having a slowly rotating drum designed to concentrate and maintain aerosol suspended along the central axis and prevent settling. The drum can be constructed of ultraviolet (UV) transparent material and the internal temperature and humidity can be controlled. The aerosol can be aged or exposed to various environmental factors (e.g., temperature extremes, humidity extremes, UV light, etc.) for short or long periods of time, and then evacuated into an exposure chamber or collected for analysis to determine the effects of aging or environmental conditions on the viability of the biological/chemical agent. The aerosol can be concentrated by an "inverted" virtual impactor that prevents particles from being evacuated from the drum by obstructing particle advection within the exiting streamlines.

The system can be operated by slowly rotating the drum at low rotational speeds. Aerosol can be injected via the inlet port, and air can be evacuated via the inverted impactor (concentrating) nozzle to concentrate the aerosol particles within the drum. In at least one embodiment, once the desired aerosol concentration is reached, both ports are closed and the aerosol is aged for the desired amount of time and exposed to the desired environmental conditions (e.g., UV light). At the end of the aging period, the aerosol can be evacuated into an exposure chamber or other testing apparatus through the inlet port.

Thus, the system can concentrate the aerosol, expose the aerosol to environmental conditions (i.e., UV light) prior to use, and expose animals to aerosol directly from the drum. Currently available rotating drums only provide the ability to age the aerosol and are not able to reach concentrations above the initial concentration of the nebulizer.

The system can allow a user to examine the effects of aging and environment on the viability of chemical or biological aerosols by simulating operational environments relevant to military operations. The system may facilitate the exposure of animal experimental models to biological and chemical agents for pathogenesis/toxicity studies, and for therapeutic/vaccine/prophylactic development against operationally relevant agents. The system can provide a means to study the effects of time and environment on the properties of biological aerosols. This may inform infectivity studies and enable users to better understand the behavior of aerosolized biological and chemical weapons in real-world environments in order to develop more effective countermeasures.

Figure 9:
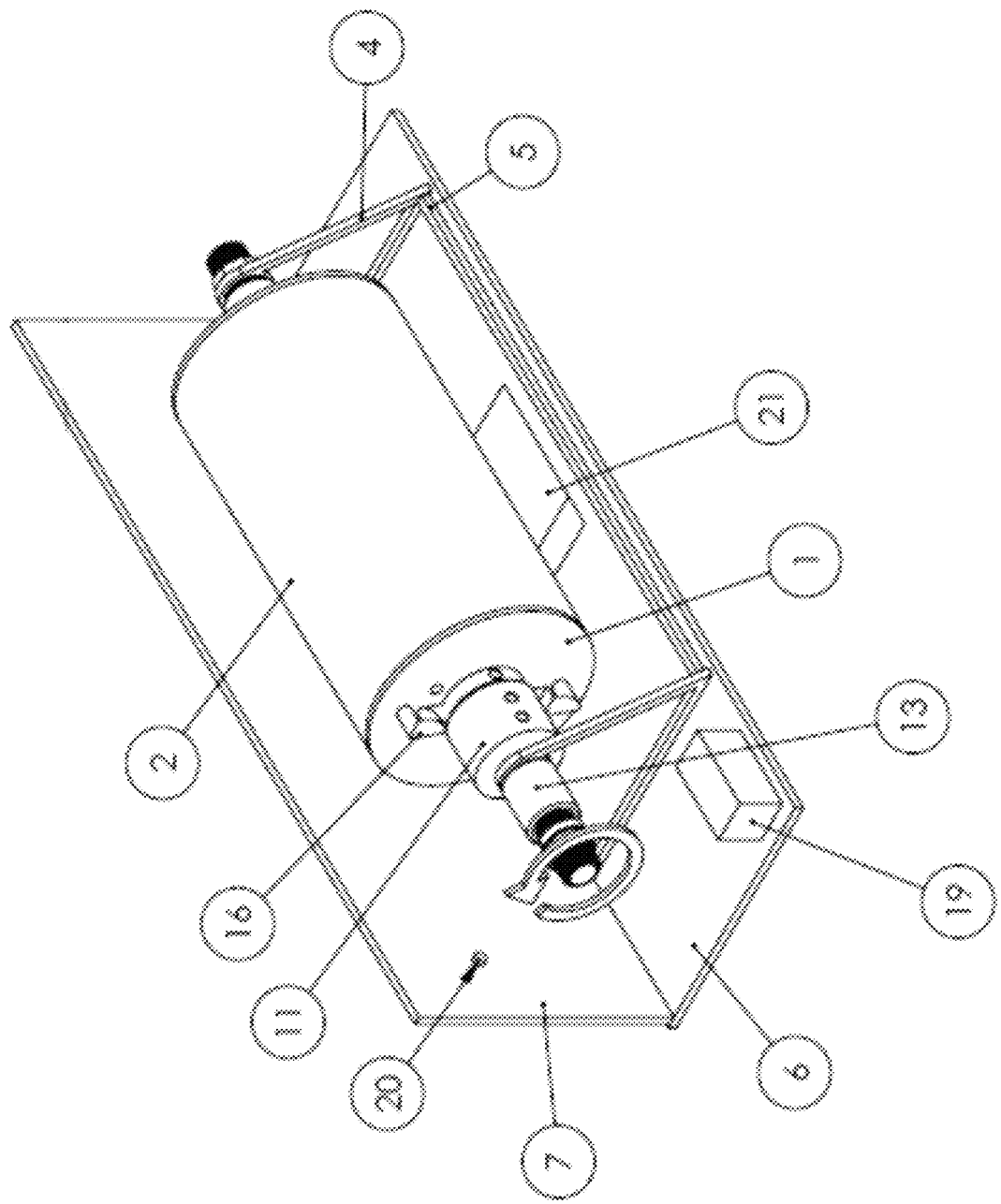
FIG. 9 illustrates a top left perspective view of a system for an aerosol aging and concentrating drum for simulating operational conditions according to an embodiment of the invention.

FIG. 9 illustrates a top left perspective view of a system 100 for an aerosol aging and concentrating drum for simulating operational conditions according to an embodiment of the invention. The system 100 can include a rotating drum concentrator (RDC) drum cap 1, an RDC drum cylinder 2, an RDC stand vertical frame 4, two RDC stand bases 5 (only one is shown), an RDC case bottom 6, two RDC case faces 7 (only one is shown), an over shaft two pass rotary union 11, two national pipe thread (NPT) couplings 13 (only one is shown), two RDC sampling tubes 16 (only one is labelled), a heater exchanger (heat/cool) 19, two temperature/humidity/pressure sensors 20 (only one is shown), and a UVA/UV-b light source 21. In the system 100, the components may be consolidated or swapped for other components.

The RDC drum cap 1 can be a stainless steel left drum face with holes for inlet, sampling, sensor wires, etc. The holes can be axially centered. The RDC drum cylinder 2 can be formed from specialized glass akin to borosilicate glass and can have a high thermal conductivity as well as UVA/UV-B transparency. The RDC stand vertical frame 4 and the RDC stand bases 5 can be formed from stainless steel and dampen vibrations caused by the concentrating procedure and drum rotation. The case can include the RDC case bottom 6, the RDC case faces 7, two RDC case sides (not shown), and an RDC case top (not shown). The case can be formed from acrylic or a similar polymer and can provide a space to heat and cool the drum and aerosol as well as provide safety to the operator from the rotating elements.

The over shaft two pass rotary union 11 and the NPT couplings 13 can form a rotary union providing a means of sampling and transporting electrical signals across the rotational plane. The over shaft two pass rotary union 11 and the NPT couplings 13 can be formed from stainless steel and corrosion/chemical resistant rolling elements. The RDC sampling tubes 16 can allow for periodic sampling of the aerosol particles. The heater exchanger 19 can heat or cool the enclosure and thus the drum to a wide environmental temperature range; and, the temperature/humidity/pressure sensors 20 can monitor temperatures, humidity, pressures, and UV levels inside the enclosure and drum. The UVA/UV-b light source 21 can generate sun simulating UVA/UV-B spectrum rays. The heater exchanger 19, the temperature/humidity/pressure sensors 20, and the UVA/UV-b light source 21 can be formed from corrosion resistant materials.

Figure 10:
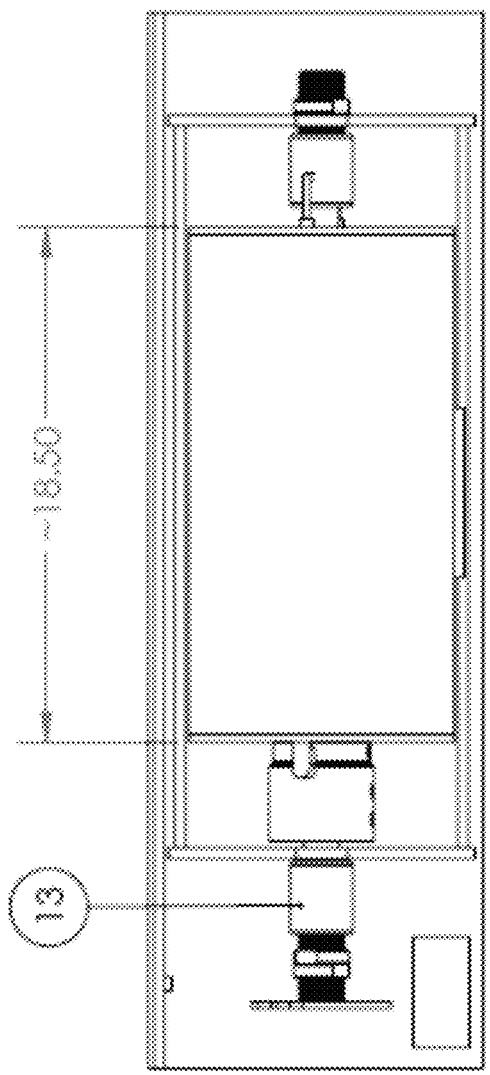
FIG. 10 illustrates a top view of the system illustrated in FIG. 9.
Figure 11:
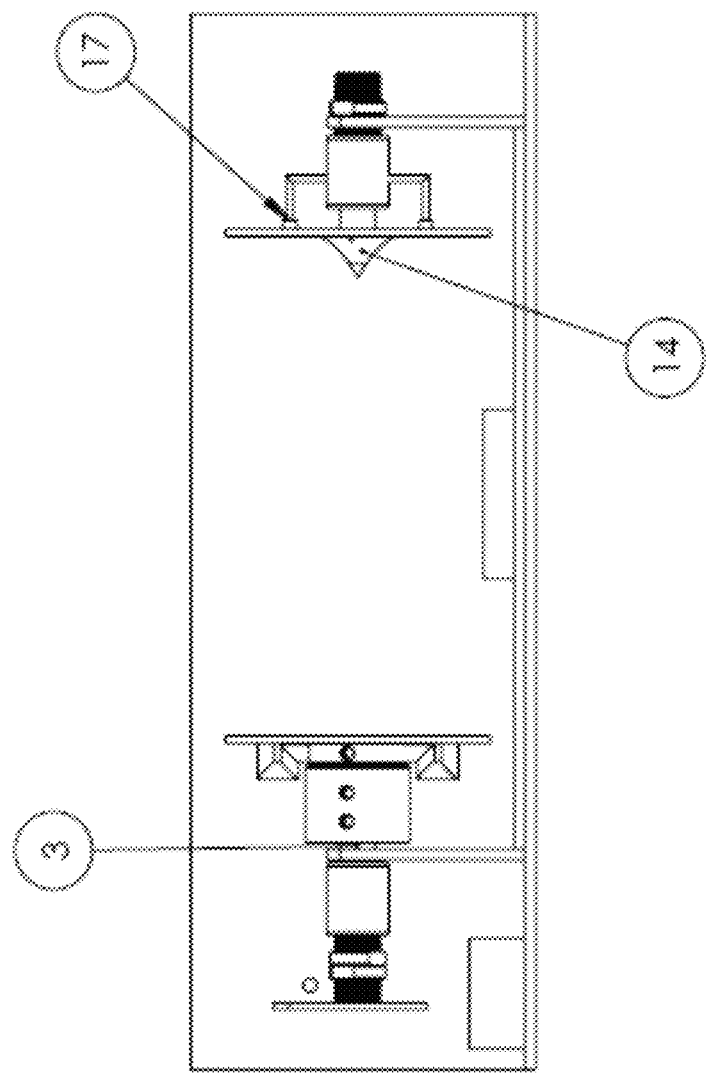
FIG. 11 illustrates a front view of the system illustrated in FIG. 9.
Figure 13:
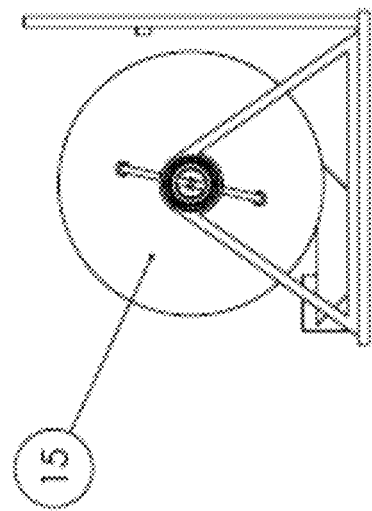
FIG. 13 illustrates a right side view of the system illustrated in FIG. 9.
Figure 12:
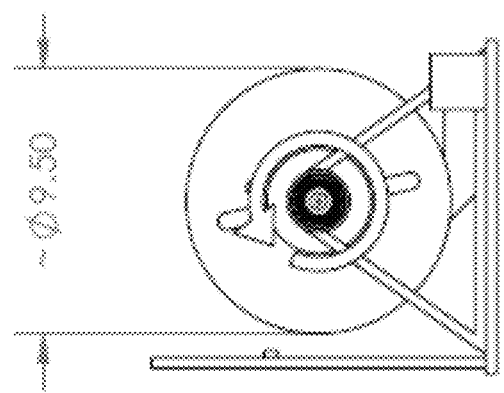
FIG. 12 illustrates a left side view of the system illustrated in FIG. 9.
Figure 14:
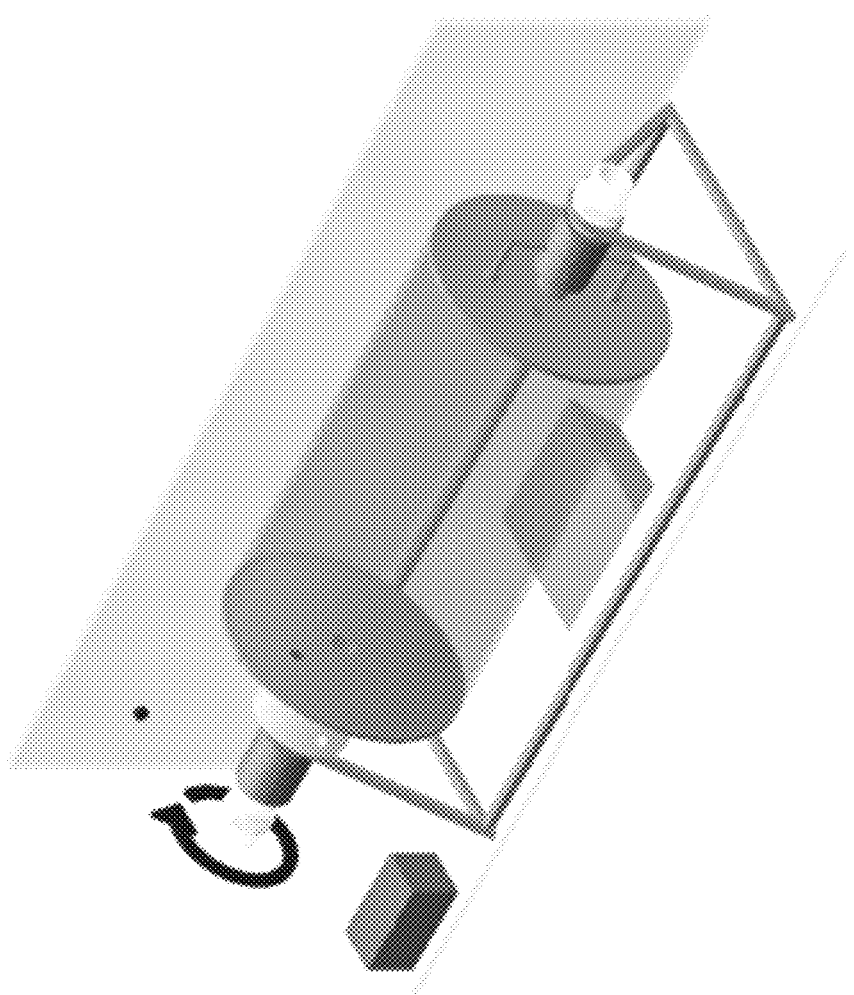
FIG. 14 illustrates a top right perspective view of the system illustrated in FIG. 9.
Figure 15:
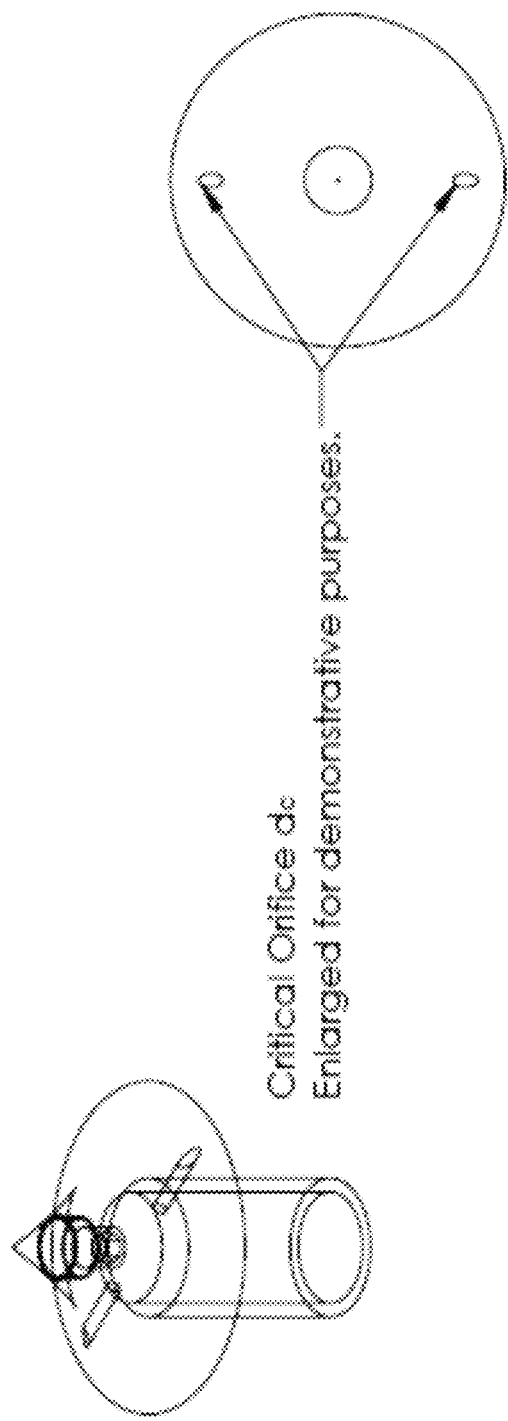
FIG. 15 illustrates the geometry of the rotating drum aerosol concentrator according to an embodiment of the invention.
Figure 18:
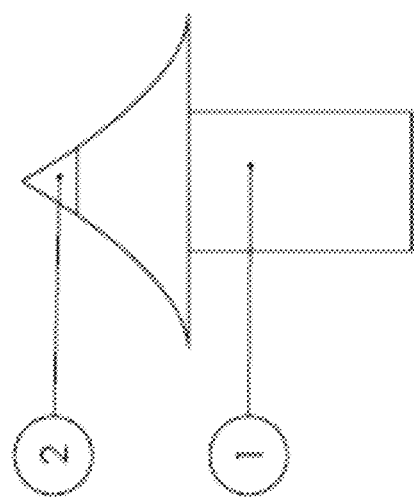
FIG. 18 illustrates the geometry of the rotating drum aerosol concentrator according to an embodiment of the invention.

FIG. 10 illustrates a top view of the system 100 showing an NPT coupling 13. In at least one embodiment, the RDC drum cylinder 2 can be 18.50 centimeters long. FIG. 11 illustrates a front view of the system 100 showing an RDC inlet 3, an RDC cone assembly 14, and an RDC vacuum valve system 17. FIG. 12 illustrates a left side view of the system 100; and, FIG. 13 illustrates a right side view of the system 100 showing an RDC drum cap right 15. FIG. 14 illustrates a top right perspective view of the system 100. Although not shown, the system 100 can further include two shaft bearings and two simple single pass rotary unions.

Figure 19:
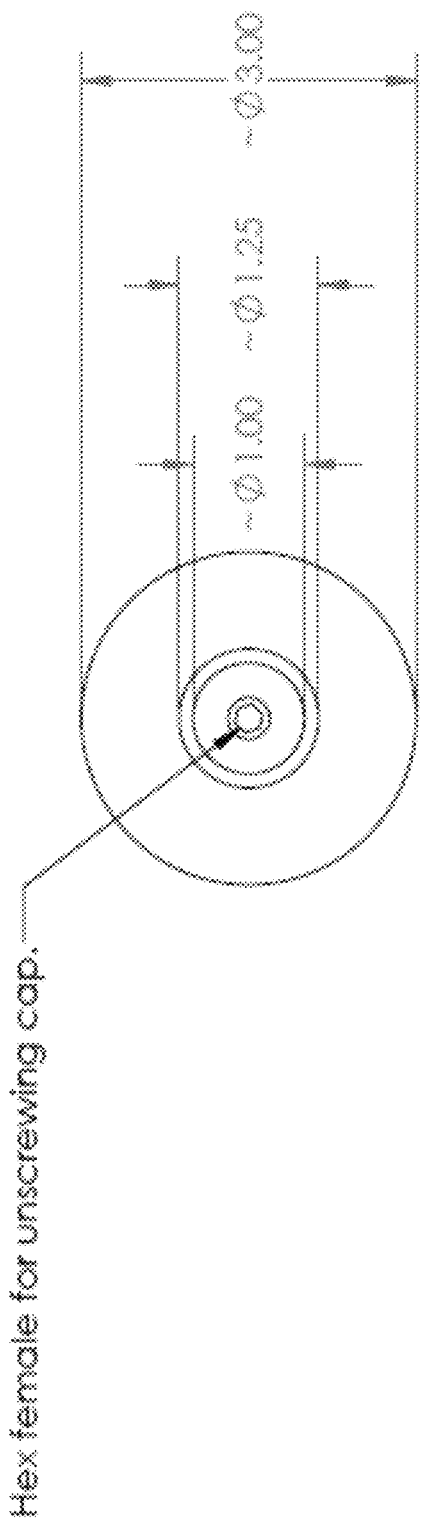
FIG. 19 illustrates the geometry of the rotating drum aerosol concentrator according to an embodiment of the invention.

FIGS. 15-19 illustrate the geometry of the rotating drum aerosol concentrator according to an embodiment of the invention. The aerosol concentrator can perform like a virtual impactor by fractionating particles above a design cut-point according to their inertia. Aerosol particles entering the drum can be focused at the apex (item 2 in FIG. 18) of the triangular concentrator nose. Particles with sufficient inertia can be diverted back into the core of the drum by the angular nose. In at least one embodiment, smaller particles without sufficient inertia, along with water vapor and gases, negotiate the change in direction to enter the jet nozzles shown in FIGS. 15, 16, and 17, and are removed from the drum through the exit column shown in item 1 of FIG. 18. FIG. 19 illustrates the geometry of the rotating drum aerosol concentrator according to an embodiment of the invention.

Figure 20:
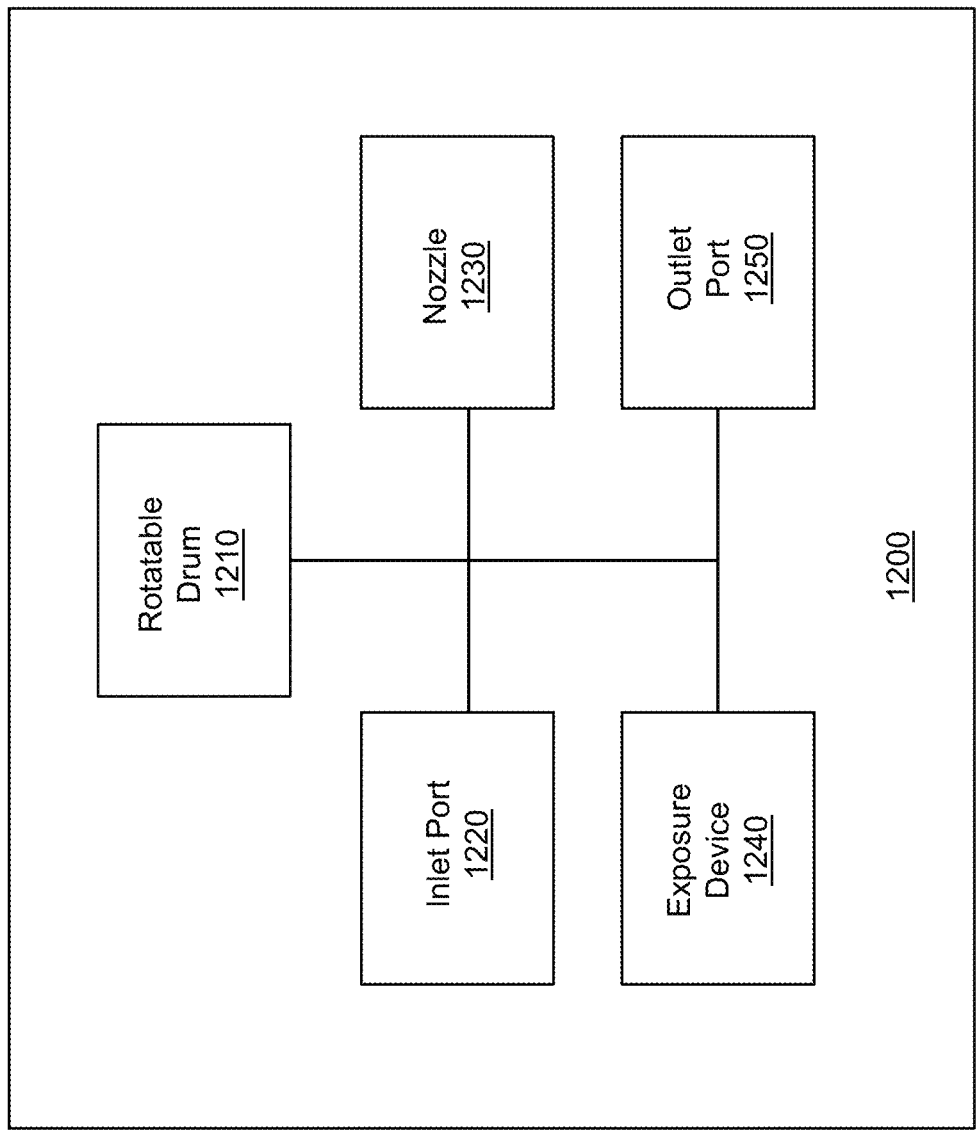
FIG. 20 illustrates a system of aerosol aging and concentrating for simulating operational conditions according to an embodiment of the invention.

FIG. 20 illustrates a system 1200 for aerosol aging and concentrating for simulating operational conditions according to an embodiment of the invention. The system 1200 can include a rotatable drum 1210 that maintains the aerosol particles suspended along a central axis of rotation of the rotatable drum 1210. This can prevent the aerosol particles from settling on the bottom of the rotatable drum 1210. The rotatable drum 1210 can be at least partially ultraviolet light transparent material.

An inlet port 1220 can be connected to the rotatable drum 1210, where the inlet port 1220 can receive aerosol particles. A nozzle 1230 connected to the rotatable drum 1210 can expel air from the rotatable drum 1210 to concentrate the aerosol particles within the rotatable drum 1210.

An exposure device 1240 can expose the aerosol particles within the rotatable drum 1210 to one or environmental conditions. For instance, the exposure device 1240 can expose the aerosol particles to ultraviolet light, heat, cold, high humidity, and/or low humidity. An increase or decrease in temperature can be induced using a heat exchanger around the rotatable drum 1210. In at least one embodiment, humidity is changed with a humidifying component (e.g., an in-line dryer and/or in-line humidification device) that is placed upstream of the drum in the aerosol line. A quad track diffusion dryer can be placed in line to reduce the humidity. The system 1200 can also include a thermometer and/or a humidity sensor in the rotatable drum 1210.

An outlet port 1250 connected to the rotatable drum 1210 can evacuate the aerosol particles directly from the rotatable drum 1210 into an exposure chamber and/or a testing apparatus. The system 1200 can also include an inverted virtual impactor that concentrates the aerosol particles and prevents the aerosol particles from being evacuated from the rotatable drum 1210 by obstructing particle advection within exiting streamlines.

FIG. 21 is a flow diagram illustrating a method for aerosol aging and concentrating for simulating operational conditions according to an embodiment of the invention (e.g., using the system 1200). Aerosol particles can be injected into an inlet port of a rotating drum 1310. Air can be expelled from the rotating drum via a nozzle to concentrate the aerosol particles within the rotating drum 1320. The inlet port and the nozzle can be closed when the desired aerosol concentration is reached 1330.

The aerosol particles can be exposed to one or more environmental conditions, such as, for example ultraviolet light, heat (e.g., above ambient temperature), cold (e.g., below ambient temperature), high humidity (e.g., above ambient humidity), and low humidity (e.g., below ambient humidity) 1340. In at least one embodiment, the rotating drum is formed from ultraviolet light transparent material and the rotating drum maintains the aerosol particles suspended along a central axis of rotation of the rotating drum to prevent the aerosol particles from settling on a bottom of the rotating drum. This can be accomplished via centripetal force. In at least one embodiment, the aerosol particles are concentrated by an inverted virtual impactor that prevents the aerosol particles from being evacuated from the drum by obstructing particle advection within exiting streamlines. The aerosol particles can be evacuated directly from the rotating drum into an exposure chamber and/or a testing apparatus after an aging period 1350.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An aerosol concentrating apparatus for use with an aerosol aging drum, said aerosol concentrating apparatus comprising:
   an outer housing;
   an aerosol inlet tube connected to said outer housing;
   an extraction tube connected to said outer housing;
   an axle connected to said outer housing such that said axle is axially centered within said outer housing, said axle being formed from porous material; and
   an inner housing connected to said axle, such that said axle is axially centered within said inner housing, such that said inner housing is adapted to spin about said axle within said outer housing to separate aerosol particles by size, and such that aerosol particles below a first threshold size are forced out of said aerosol concentrating apparatus through said axle, and aerosol particles between the first threshold size and a second threshold size are suspended within said inner housing.

2. The aerosol concentrating apparatus according to claim 1, wherein aerosol particles above the second threshold size are forced against an inner wall of said outer housing.

3. The aerosol concentrating apparatus according to claim 1, wherein said outer housing has a cylindrical shape.

4. The aerosol concentrating apparatus according to claim 1, wherein said apparatus has a vertical orientation, and said inner housing has a cylindrical shape and an open end spaced from a top of said outer housing.

5. The aerosol concentrating apparatus according to claim 1, wherein said inner housing is formed from wire mesh.

6. The aerosol concentrating apparatus according to claim 1, wherein said inner housing is adapted to spin about said axis axle at a rate up to three thousand rotations per minute, and said outer housing is stationary.

7. The aerosol concentrating apparatus according to claim 1, wherein
   said porous material covers a substantial length of said axle,
   said axle includes a closed end and an open end,
   said inner housing is cylindrical and includes an open end facing said aerosol inlet tube and said extraction tube,
   said aerosol inlet tube is spaced a shorter radial distance from said axle than a radius of said cylindrical inner housing, and
   said outer housing is stationary and connected to said axle with a pair of bearings allowing rotation of said axle relative to said outer housing.

8. An aerosol concentrating apparatus for use with an aerosol aging drum, said aerosol concentrating apparatus comprising:
   a pair of bearings;

an axle on which said bearings are mounted and spaced along said axle, said axle including porous material between said bearings, said porous material configured to allow aerosol particles below a first threshold size to pass therethrough;

an outer housing attached to said bearings such that said axle passes through an axial center of said outer housing, said outer housing including a chamber;

an aerosol inlet tube in fluid communication with said chamber of said outer housing;

an extraction tube in fluid communication with said chamber of said outer housing; and an inner housing connected to said axle such that said axle is axially centered within said inner housing, said inner housing is within said outer housing, wherein said inner housing rotates with said axle, said inner housing configured to separate aerosol particles by size, and wherein said porous material runs from where said inner housing connects to said axle to the furthest of said bearings.

9. The aerosol concentrating apparatus according to claim 8, wherein aerosol particles above a second threshold size are forced against an inner wall of said outer housing and aerosol particles between the first threshold size and the second threshold size are suspended within said inner housing during operation of said apparatus.

10. The aerosol concentrating apparatus according to claim 9, wherein said extraction tube is configured to extract aerosol particles from an area defined by said inner housing.

11. The aerosol concentrating apparatus according to claim 8, wherein said outer housing has a cylindrical shape and said inner housing has a cylindrical shape.

12. The aerosol concentrating apparatus according to claim 11, wherein said inner housing includes a wire mesh for a cylindrical section parallel to said axle.

13. The aerosol concentrating apparatus according to claim 8, wherein said inner housing includes a wire mesh.

14. The aerosol concentrating apparatus according to claim 8, wherein said inner housing includes a wire mesh basket.

15. The aerosol concentrating apparatus according to claim 8, wherein said inner housing is adapted to spin about said axis axle at a rate up to three thousand rotations per minute.

16. The aerosol concentrating apparatus according to claim 8, wherein a flow into said outer housing from said aerosol inlet tube is equal to a flow out from said axle and said extraction tube.

17. The aerosol concentrating apparatus according to claim 8, wherein said axle includes a closed end and an open end.

18. The aerosol concentrating apparatus according to claim 8, wherein said outer housing includes ultraviolet transparent material.

19. The aerosol concentrating apparatus according to claim 8, wherein
said axle, said outer housing and said inner housing have a vertical orientation,
said axle includes a closed end and an open end,
said inner housing having an open end spaced from both ends of said outer housing and facing towards said aerosol inlet tube and said extraction tube, said inner housing having a closed end spaced from both ends of said outer housing, and
said aerosol inlet tube and said extraction tube are on the same end of said outer housing.

20. The aerosol concentrating apparatus according to claim 19, wherein said aerosol inlet tube extends into the chamber of said outer housing.

* * * * *